Nov. 18, 1924.

F. F. COX ET AL 1,516,174

FISHING DEVICE

Filed Sept. 17, 1923

F. F. Cox
C. C. Post
INVENTOR

BY *Victor J. Evans*
ATTORNEY

Patented Nov. 18, 1924.

1,516,174

UNITED STATES PATENT OFFICE.

FRANK F. COX AND CHARLES C. POST, OF LOS ANGELES, CALIFORNIA.

FISHING DEVICE.

Application filed September 17, 1923. Serial No. 663,255.

*To all whom it may concern:*

Be it known that we, FRANK F. COX and CHARLES C. POST, citizens of the United States, residing at Los Angeles, in the county of Los Angeles and State of California, have invented new and useful Improvements in Fishing Devices, of which the following is a specification.

This invention has reference to a fishing device.

Our primary object is to produce a fish snare in which the bait is not accessible to the fish attracted thereby.

A further and important object is to produce a snare for holding live bait, which bait is so caged as to be protected from fish attracted thereby, and which will obviate the cruel practice of passing a hook through the gill and mouth of live bait.

A further object is to produce a snare which serves as a housing for fishing bait, in which the bait is arranged in a longitudinally adjustable spiral cage so that bait of varying sizes may be employed and rendered perceptible for attracting fish to be snared.

To the attainment of the foregoing, and other objects which will present themselves as the nature of the invention is better understood, reference is to be had to the drawing which accompanies and which forms part of this application.

In the drawing:—

Figure 1:
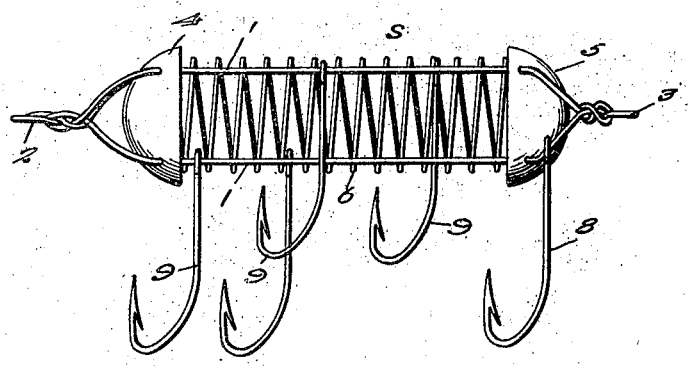
Figure 1 is a side elevation of a fishing snare in accordance with this invention.
Figure 2:
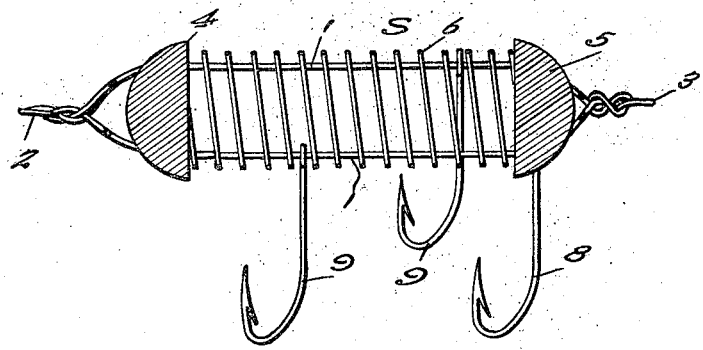
Figure 2 is an approximately central vertical longitudinal sectional view therethrough.
Figure 3:
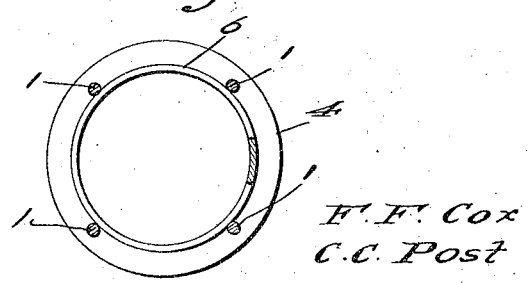
Figure 3 is a transverse sectional view taken in a line with one of the longitudinal adjustable head members.

The snare, in its entirety, is broadly indicated by the character S. The snare includes a frame made up of non-corrosive rightangularly arranged spring arms 1 respectively. These arms have their ends bent inwardly toward each other and connected and formed with eyes 2 and 3 respectively. These eyes may receive therethrough the fishing line, or the line may be attached to only one of the eyes. Slidably arranged on the frame that comprises the spring arms are end members which are preferably in the nature of wooden heads 4 and 5 respectively. Of course, these heads are provided with openings through which the spring arms pass, and the tension exerted by the arms against the walls of these openings is sufficient to hold the heads adjusted on the frame with respect to each other. By this arrangement bait of varying sizes may be arranged in the frame.

Arranged in the frame, and in contacting engagement with the opposed faces of the heads 4 and 5 there is a light spiral spring 6 which, however, is of sufficient strength to have its ends at all times contact with the heads. By compressing the spring from one end thereof the bait may be arranged therein. The device is primarily devised for a live bait, but, of course, other bait may be received in the spiral body 6. The heads may be adjusted to compress the last mentioned bait between the spirals of the spring 6 to serve as an additional attraction for the fish.

On the outer inwardly directed ends of the spring arms 1 there are slidable hooks 8, and on the arms proper, at desired intervals, there are other slidable hooks 9.

The foregoing description, when taken in connection with the drawing will, it is thought, fully set forth the construction and advantages of my improvement. Fish attracted by the bait in the cage provided by the frame and the spiral spring may be snagged by any of the hooks and as the bait is not accessible to the fish, the same may be used for an indefinite period, that is, for an entire fishing.

Having described the invention, we claim:—

1. A fishing device, as herein described, comprising an open frame having fishing hooks slidable thereon and a spiral spring comprising a bait holder in the frame.

2. A fishing snare, as herein described, comprising an open frame, head members longitudinally adjustable on the frame, a spiral spring providing a bait holder in the frame and in contact with the head members, and slidable hooks on the frame.

3. A fishing snare comprising an open frame made of spring wires which have their ends connected and formed with eyes, hooks slidable on the frame, head members slidable on the frame and frictionally contacted thereby, and a spiral spring providing a bait holder arranged in the frame and having its ends contacting the head members.

In testimony whereof we affix our signatures.

FRANK F. COX.
CHARLES C. POST.